(12) United States Patent
Nakagawa

(10) Patent No.: US 6,987,649 B2
(45) Date of Patent: Jan. 17, 2006

(54) MAGNETIC HEAD APPARATUS WITH MICROACTUATOR HAVING FUNCTION OF SHORT-CIRCUITING BOTH ELECTRODES OF EPIEZOELECTRIC ELEMENTS AND METHOD OF MANUFACTURING THE SAME

(75) Inventor: Masayoshi Nakagawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 206 days.

(21) Appl. No.: 09/943,833

(22) Filed: Aug. 30, 2001

(65) Prior Publication Data

US 2002/0145831 A1 Oct. 10, 2002

(30) Foreign Application Priority Data

Sep. 4, 2000 (JP) ........................ 2000-267294

(51) Int. Cl.
*G11B 5/56* (2006.01)

(52) U.S. Cl. .................................... 360/294.4
(58) Field of Classification Search ........... 360/294.4, 360/264.2, 244.1, 245.8, 245.9, 246, 323; 361/685
See application file for complete search history.

(56) References Cited

U.S. PATENT DOCUMENTS

| | | | |
|---|---|---|---|
| 5,898,544 A | 4/1999 | Krinke et al. ............ 360/264.5 |
| 5,973,882 A | 10/1999 | Tangren .................... 360/245.6 |
| 6,025,988 A * | 2/2000 | Yan ............................. 361/685 |
| 6,163,443 A * | 12/2000 | Hatagami et al. ........... 360/323 |
| 6,424,505 B1 * | 7/2002 | Lam et al. ................... 360/323 |
| 6,480,359 B1 * | 11/2002 | Dunn et al. ............... 360/245.9 |
| 6,507,467 B1 * | 1/2003 | Schadewald et al. ....... 360/323 |
| 2002/0044392 A1 * | 4/2002 | Bougtaghou et al. ....... 360/323 |

FOREIGN PATENT DOCUMENTS

| | | |
|---|---|---|
| JP | 2000-123340 | 4/2000 |
| JP | 2000-163896 | 6/2000 |

* cited by examiner

*Primary Examiner*—Tianjie Chen
(74) *Attorney, Agent, or Firm*—Brinks, Hofer, Gilson & Lione

(57) ABSTRACT

The supersonic cleaning of a magnetic head apparatus is executed while the control conductive pattern and the conductive leaf spring are electrically connected by means of soldering, and the conductive leaf spring is grounded. This makes it possible to prevent the accumulation of electrostatic charges in the piezoelectric elements on the magnetic head apparatus, thereby preventing the development of surge current or reducing the intensity thereof, and reducing the damage to the reproducing elements and the recording element mounted on the slider of the magnetic head apparatus.

8 Claims, 10 Drawing Sheets

MAGNETIC HEAD APPARATUS WITH MICROACTUATOR HAVING FUNCTION OF SHORT-CIRCUITING BOTH ELECTRODES OF EPIEZOELECTRIC ELEMENTS AND METHOD OF MANUFACTURING THE SAME

This application claims priority under 35 U.S.C. §119 to Japanese Patent Application No. 2000-267294 filed Sep. 4, 2000.

BACKGROUND OF THE INVENTION

1. Field of the Invention

This invention relates to a magnetic head apparatus comprising a reproducing element with an MR head (reproducing head) mounted thereon, and wherein a piezoelectric element is mounted on a support member supporting the MR head. This invention also relates to a method of manufacturing the magnetic head apparatus. In particular, this invention relates to a magnetic head apparatus that has been improved to avoid damage to the MR head, as well as to a manufacturing method thereof.

2. Description of the Related Art

FIG. 10 is a top plan view of a conventional hard disk apparatus. A magnetic disk 1 is rotated by a spindle motor 2.

A load beam 4 constituting a support member is connected to the distal end 3a of a rigid carriage 3, and at the distal end 4a of a load beam 4, a slider 5 is fitted through a flexure (not shown).

The load beam 4 comprises a leaf spring. The load beam 4 has a fixed base end 4b which is fixed on the carriage 3. The distal end 4a of the load beam 4 supports the slider 5.

The slider 5 includes a reproducing element for detecting, by magnetoresistive effect, the magnetic signals recorded on the magnetic disk 1, and a recording element for recording magnetic signals on the magnetic disk 1. The slider 5 floats above the magnetic disk 1 by the action of air streams created by the rotation of the magnetic disk 1 so as to record and reproduce the magnetic signals.

A voice coil motor 6 is fixed to the base end 3b of the carriage 3.

By the action of the voice coil motor 6, the carriage 3 and the load beam 4 are driven in the radial direction of the magnetic disk 1, thus implementing a seeking operation for moving the reproducing element and the recording element mounted on the slider 5 to any recording track, as well as implementing a tracking operation for keeping the reproducing element and the recording element on the central line of a particular recording track.

The higher recording density of the magnetic disk 1 makes it necessary to improve the precision of tracking operations. Hitherto, the seeking operation and tracking operation have been carried out only by driving the carriage 3 by means of the voice coil motor 6.

In order to improve the precision of the tracking operation, it is necessary to raise the servo band of the servo system including the voice coil motor 6. The servo band, however, is limited by the mechanical resonance frequency of the carriage 3 and that of the bearing (not illustrated) rotatably supporting the carriage 3. The mechanical resonance frequency of the carriage 3 depends on the size of the carriage 3, which in turn depends on the diameter of the magnetic disk 1 prescribed by the standard. For example, when the diameter of the magnetic disk 1 is 3.5 inches, the resonance frequency of the carriage 3 and the bearing is about 3.5 kHz.

When the resonance frequency of the carriage 3 and the bearing is about 3.5 kHz, the upper limit of the servo band is approximately 700 Hz in a servo system that performs tracking operations solely by driving the carriage 3 by means of the voice coil motor 6.

Therefore, a method has been recently proposed in which a fine motion actuator is mounted on a load beam, and tracking operation is performed only by moving the distal end of the load beam.

FIG. 11 is a perspective view of a conventional load beam on which piezoelectric elements acting as fine motion actuators are mounted. This load beam 11 consists of a stainless steel leaf spring, and has a fixed base end 11a held by the carriage and a swingable portion 11b swingable relative to the fixed base end 11a. On both sides of the front end of the fixed base end 11a, arms 11c and 11c extend in the lengthwise direction of the fixed base end 11a. The swingable portion 11b is connected to the arms 11c and 11c through elastic support members 11d and 11d.

In addition, the swingable portion 11b and the fixed base end 11a carry piezoelectric elements 12 and 13 that bridge over a gap 11e. The piezoelectric elements 12 and 13 have piezoelectric layers 12b and 13b that are overlain and underlain by electrode layers 12a1 and 13a1, and by 12a2 and 13a2, respectively.

The load beam 11 shown in FIG. 11 is grounded. The electrode layers 12a1 and 13a1 of the piezoelectric elements 12 and 13 are grounded by being electrically connected to the load beam. The piezoelectric layers 12b and 13b of the piezoelectric elements 12 and 13, respectively, are polarized in the thicknesswise counter directions. Therefore, when the same potential is applied to the electrode layers 12a2 and 13a2, one of the piezoelectric elements expands while the other piezoelectric element contracts in the longitudinal direction.

As a result, the elastic support members 11d and 11d are distorted, causing a change in the posture of the slider 21 fixed on the distal end of the swingable portion 11b. In other words, it becomes possible to perform a tracking operation by moving the slider attached to the distal end of the swingable portion 11b in the widthwise direction of tracks. When the servo system is constituted by a load beam carrying piezoelectric elements mounted thereon, the servo band can be widened to 2 kHz or greater.

The piezoelectric elements 12 and 13 are elements that cause distortions when an electric voltage is applied to the electrode layers 12a1, 12a2, 13a1 and 13a2. On the other hand, the application of a stress on the piezoelectric elements 12 and 13 causes distortions in the piezoelectric elements 12 and 13, and generates a voltage between the electrode layers 12a1 and 12a2, as well as between 13a1 and 13a2.

In particular during the process of supersonic cleaning or transportation of the magnetic head apparatus, the piezoelectric elements 12 and 13 may be subjected to vibrations of a considerable magnitude that cause a very high voltage to be developed in the piezoelectric elements 12 and 13. When they come into contact with a conductor, a surge current may flow. This current can have a frequency of several hundreds to several thousands of MHz and a magnitude of several amperes. Such a high frequency current may generate an induced current in the neighboring conductive pattern. This high-frequency voltage leads to capacity couplings with the neighboring conductive patterns and the transportation of electric currents. For example, during cleaning, the transportation of current occurs due to capacity coupling through the intermediary of water whose induction ratio is several dozen times greater than that of air. In particular, reproducing elements whose resistance against electric current is low were often destroyed by this electric current generated during supersonic cleaning and transportation.

SUMMARY OF THE INVENTION

The present invention is aimed at overcoming the above-described problem, and its object is to provide a magnetic head apparatus capable of preventing the accumulation of electrostatic charge and reducing damage to the reproducing element and the recording element by short-circuiting the electrodes of the piezoelectric elements after an inspection of the product magnetic head apparatus, thereby preventing accumulation of electrostatic charges in the piezoelectric element, and thus diminishing the damage of the reproducing and recording elements, as well as a method of manufacturing such a magnetic head apparatus.

To these ends, in accordance with one aspect of the present invention, there is provided a magnetic head apparatus, comprising: a slider carrying a reproducing element for detecting magnetic signals recorded on a recording medium by a magnetoresistive effect and a recording element for recording magnetic signals in the recording medium; a wiring member including conductive patterns for reproduction connected with the reproducing element and conductive patterns for recording connected with the recording element; elastic support members for supporting the slider and the wiring member, and piezoelectric elements for changing the posture of the slider by causing distortions of the elastic support members; wherein the electric potentials of the electrodes of the piezoelectric elements are held equal.

Piezoelectric elements generate very high voltages when subjected to large vibrations during, for example, supersonic cleaning and transportation of the magnetic head apparatus, thus posing a danger of a large electrical current flowing in the reproducing and recording elements.

In accordance with the present invention, however, accumulation of electrostatic charges in the piezoelectric elements can be avoided when the magnetic head apparatus is transported or subjected to supersonic cleaning, by virtue of the fact that the potentials of the electrodes of the piezoelectric elements are equalized. It is therefore possible to prevent or suppress the generation of a surge current, thus diminishing the damage of the recording and reproducing elements.

In the magnetic head apparatus of the present invention, the arrangement may be such that at least one of the electrodes of the piezoelectric elements is a grounding electrode that is connected to a ground, and wherein the wiring member has a control conductive pattern for supplying control signals, the control conductive pattern being connected with electrodes other than the grounding electrode of the piezoelectric elements, and being connected with the ground. Thus, the potentials of all the electrodes of the piezoelectric elements are easily equalized, because these electrodes are all grounded.

It is preferred that, when a magnetic disk apparatus incorporating the magnetic head apparatus of the present invention has been completed, the control conductive pattern has been disconnected from the ground. It is also preferred that the reliability of the magnetic head apparatus is not adversely affected by the connection and disconnection of the control conductive pattern to and from the ground.

To this end, the magnetic head apparatus preferably further comprises test pads connected with the reproducing conductive pattern, the recording conductive pattern, and the control conductive pattern at the end of the wiring member opposite to the end where the wiring member and the recording element are connected together, the control conductive pattern being grounded at a region on the wiring member which is removable together with the test pads.

In order to implement the connection of the control conductive pattern to the ground, the arrangement may be such that the wiring member includes a conductive sheet on which the reproducing conductive pattern, the recording conductive pattern and the control conductive pattern are formed through an insulation layer, the insulation layer being provided at a portion thereof adjacent to the control conductive pattern with an aperture through which the conductive sheet is exposed, and the control conductive pattern being connected to the conductive sheet member via the aperture.

Alternatively, the arrangement may be such that the wiring member has a grounding pattern, the grounding pattern being electrically connected to the control conductive pattern.

In accordance with another aspect of the present invention, there is provided a method of manufacturing a magnetic head apparatus, comprising: (a) a step of forming a wiring member having a reproducing conductive pattern connected with a reproducing element for detecting magnetic signals recorded on a recording medium by magnetoresistive effect and a recording conductive pattern connected with a recording element for recording magnetic signals on the recording medium; (b) a step of attaching a slider and the wiring member to elastic support members, the slider carrying the reproducing element and the recording element; (c) a step of mounting, on the elastic support members, piezoelectric elements for changing the posture of the slider by causing distortions of the elastic support members; (d) a step of equalizing the electric potentials of all the electrodes of the piezoelectric elements by electrically connecting the electrodes; and (e) a step of cleaning the elastic support members to which the slider and the wiring member are attached while the electric potentials of the electrodes of the piezoelectric elements are held equal.

The method may be such that, in the step (d), all the electrodes of the piezoelectric elements are grounded.

In order to ground all the electrodes of the piezoelectric elements, the method of the invention may be carried out such that, for example, in the step (a), the control conductive pattern is formed on the wiring member to supply control signals to the piezoelectric elements, and, in the step (c), at least one of the electrodes of the piezoelectric elements is grounded, and the remaining electrodes are connected with the control conductive pattern, while in the step (d), the control conductive pattern is grounded.

As a more practical measure for grounding all the electrodes of the piezoelectric elements, the method of the present invention may be carried out such that, in the step (a), the wiring member is formed by forming, on a conductive sheet through the intermediary of an insulation layer, the reproducing conductive pattern, the recording conductive pattern and the control conductive pattern, the conductive sheet being connected to the ground, and an aperture is formed in the insulation layer at a position thereof adjacent to aid control conductive pattern, such that the conductive sheet is exposed through the aperture, and in the step (d), the control conductive pattern and the conductive sheet are electrically connected through the aperture.

Alternatively, the method may be carried out such that, in the step (a), a grounding pattern is formed on the wiring member, and in the step (d), the grounding pattern and the control conductive pattern are electrically connected.

Preferably, the method is carried out such that, in the step (a), test pads are formed at an end of the wiring member opposite to the end where the reproducing element and the recording element are connected, so as to be connected to the reproducing conductive pattern, the recording conductive pattern and the control conductive pattern, and the test pads are removed after the step (e).

It is also preferred that, in the step (d), the conductive control pattern is connected with the ground in an area of the wiring member that is removable together with the test pads.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
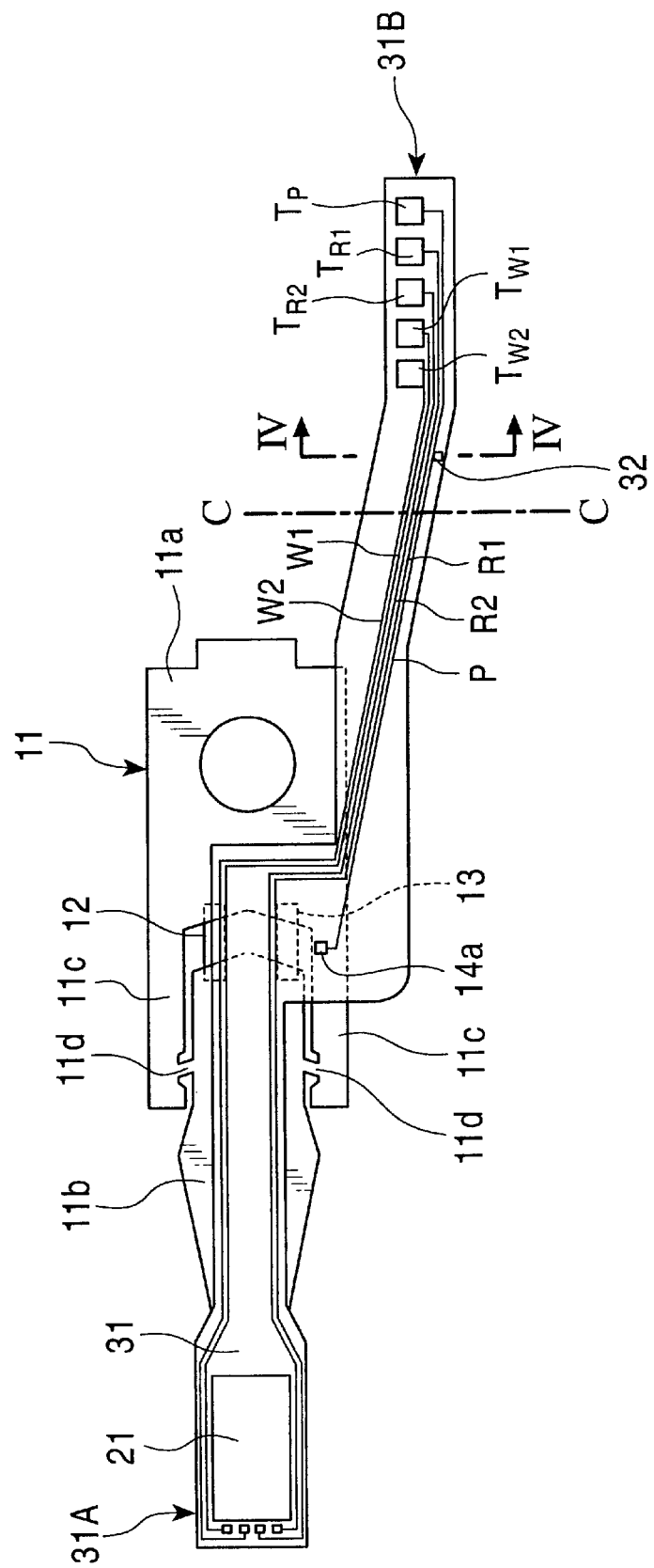
FIG. 1 is a top plan view showing the magnetic head apparatus according to the first preferred embodiment of the present invention.

FIG. 1 is a plan view of the magnetic head apparatus according to the first preferred embodiment of the present invention as seen from the side thereof opposing the recording medium.

A wiring member 31 includes reproducing conductive patterns R1 and R2, recording conductive patterns W1 and W2, and a controlling conductive pattern P. These patterns are made of conductive materials such as Cu (copper), and are formed on a thin leaf spring made of a conductive material such as stainless steel, through an intermediary of an insulation layer made of insulating materials such as polyimide.

A distal end 31A of the wiring member 31 carries a slider 21 provided with a reproducing element for detecting magnetic signals recorded on a recording medium by magnetoresistive effect and a recording element for recording magnetic signals on the recording medium. The distal end 31A of the wiring member 31 has the function of serving as a flexure.

A wiring member 31, provided with a slider 21, is attached to the side of the load beam 11 opposing the recording medium. On the load beam 11, which is an elastic support member supporting the slider 21 and the wiring member 31, piezoelectric elements are mounted. The load beam 11 is of the same type as the load beam shown in FIG. 11.

The load beam 11 consists of a stainless steel leaf spring and includes a fixed base end 11a held by the carriage and a swingable portion 11b. On both sides of the extremity of the fixed base end 11a, arms 11c and 11c extends in the lengthwise direction from the fixed base end 11a. The swingable portion 11b is connected with the arms 11c and 11c through elastic support members 11d and 11d.

The piezoelectric elements 12 and 13 are mounted on the swingable portion 11b and the fixed base end 11a, bridging over a gap 11e. The piezoelectric elements 12 and 13 consist of piezoelectric layers 12b and 13b made of piezoelectric materials overlain and underlain by electrode layers 12a1, 13a1, and 12a2 and 13a2 (see FIG. 11).

The load beam 11 is grounded. The piezoelectric layers 12a1 and 13a1 of the piezoelectric elements 12 and 13 are grounded by being electrically connected with the load beam 11. Thus, the electrode layers 12a1 and 13a1 serve as grounding electrodes.

And the electrode layers 12a2 and 13a2 are connected with a metallic wire 14 (see FIG. 11), which is connected at the terminal 14a thereof with the control conductive pattern P laid on the wiring member 31 (shown in FIG. 1).

The piezoelectric layers 12b and 13b of the piezoelectric elements 12 and 13 are polarized thickness-wise in counter directions. Therefore, when the same electric potential is applied to the electrode layers 12a2 and 13a2 through the metallic wire 14, one of the piezoelectric elements expands lengthwise while the other contracts lengthwise.

As a result, the elastic support members 11d and 11d are distorted so that the slider 21 mounted at the distal end of the swingable portion 11b changes its posture. It is thus possible to perform a tracking operation by moving the slider mounted at the distal end of the swingable portion 11b in the widthwise direction of tracks. By using a load beam provided with piezoelectric elements in a servo system, it is possible to widen the servo band to 2 kHz or more.

Figure 10:
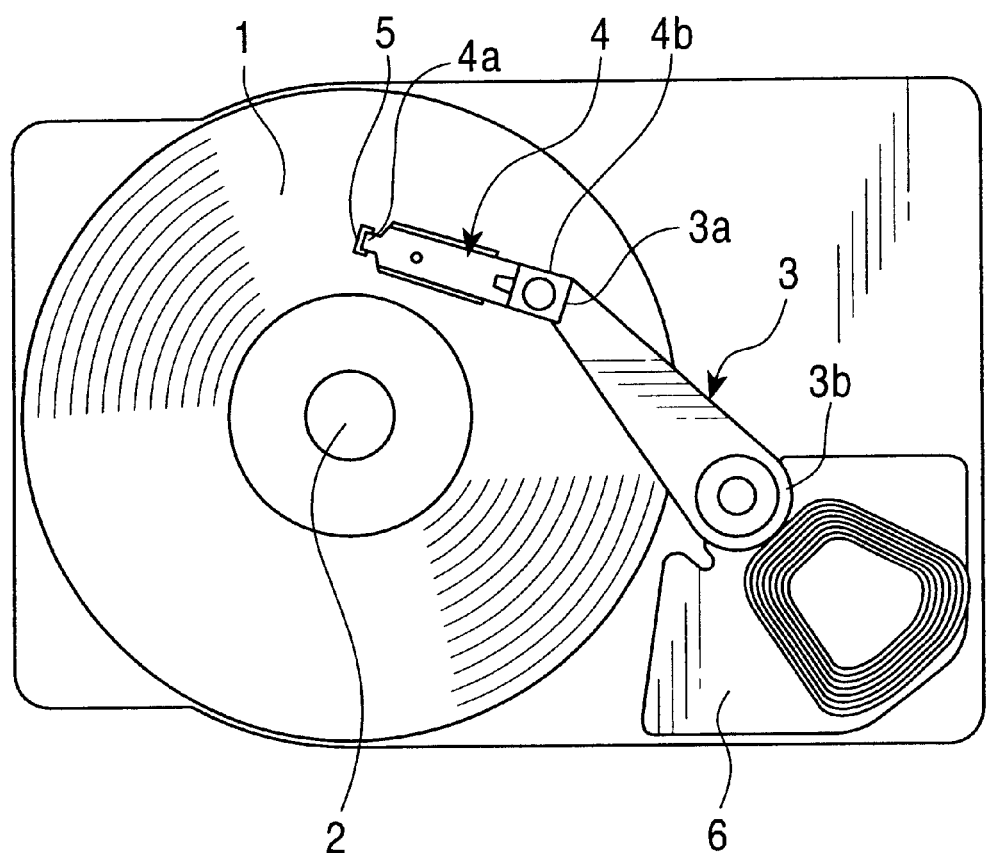
FIG. 10 is a top plan view showing a conventional hard disk apparatus.

The load beam 11 is supported by a carriage 3, which is a rigid support member in a hard disk apparatus as shown, for example, in FIG. 10.

Figure 11:
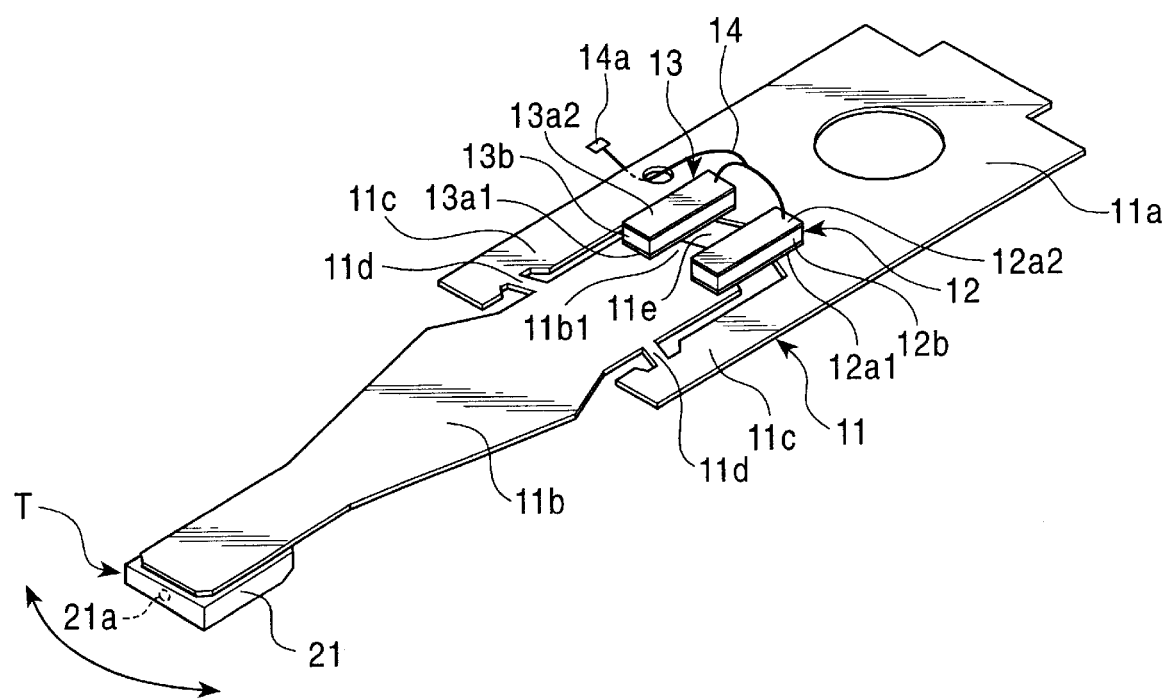
FIG. 11 is a perspective view showing a conventional load beam on which piezoelectric elements are mounted.

The slider 21 is made of ceramic materials, and on the T-shaped trailing end surface of the slider 21, a film element 21a is provided as shown in FIG. 11. An ABS surface (floating surface) is formed on the side of the slider 21 opposing the recording medium.

The film element 21a is a so-called composite film element including both a reproducing element (MR head) for reproducing magnetic recording signals recorded on the recording medium and a recording element (inductive head) for recording magnetic signals on the recording medium. The reproducing element comprises a magnetoresistive element taking advantage of the magnetoresistive effect represented, for example, by spin valve films, and a shield layer made of a magnetic material, while the recording element comprises a core made of magnetic materials and a coil arranged to form a pattern.

The reproducing conductive patterns R1, R2 and the conductive recording patterns W1, W2 are laid on the wiring member 31, and are connected respectively with the reproducing element and the recording element at the distal end 31A of the wiring member, and are connected with the test pads $T_{R1}$, $T_{R2}$ and $T_{W1}$ and $T_{W2}$ formed on the base end side 31B of the wiring member 31. The control conductive pattern P, for supplying control signals to the piezoelectric elements 12 and 13, is connected with the piezoelectric elements 12 and 13 at the terminal 14a and is also connected with the test pad $T_P$ formed on the base end side 31B.

Figure 2:
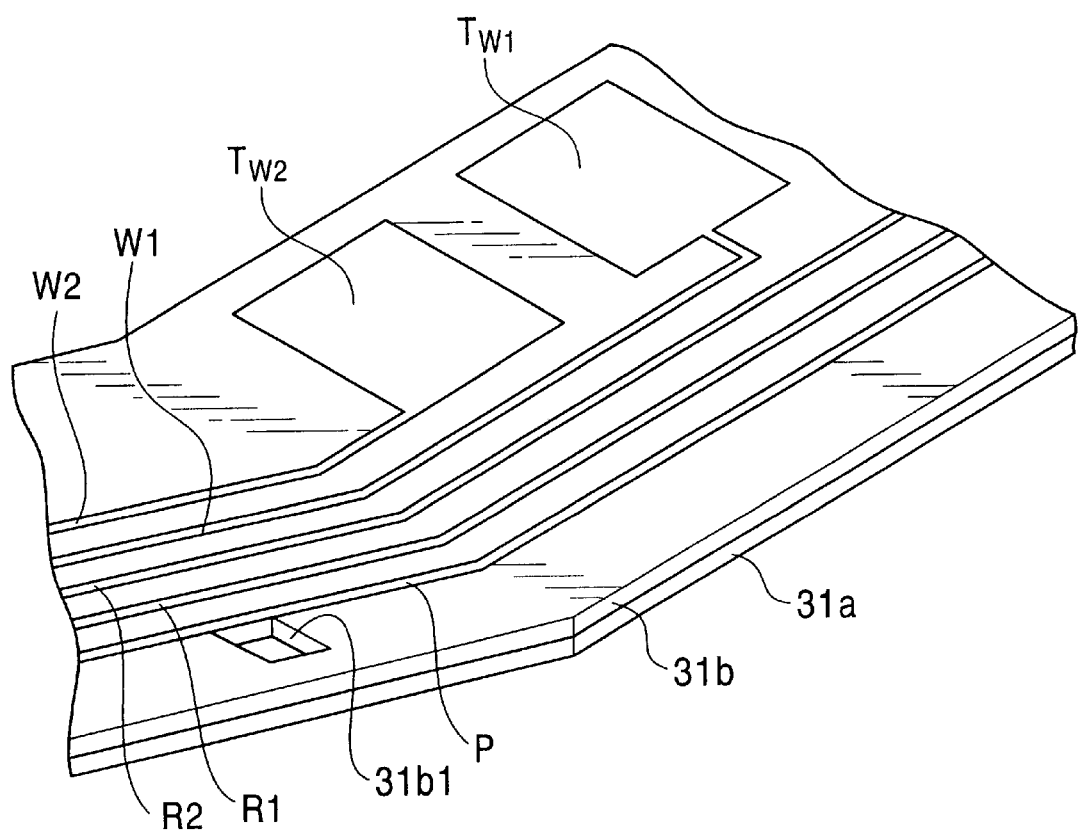
FIG. 2 is a partial perspective view of the test pads of the magnetic head apparatus shown in FIG. 1.
Figure 3:
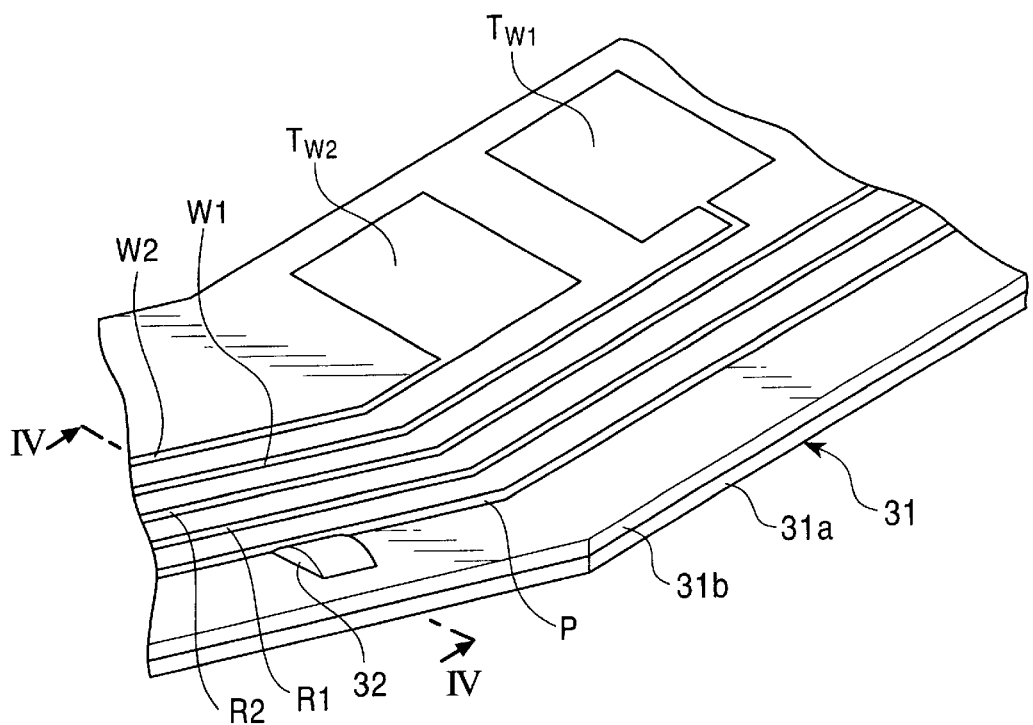
FIG. 3 is a partial perspective view of the test pads of the magnetic head apparatus shown in FIG. 1.
Figure 4:
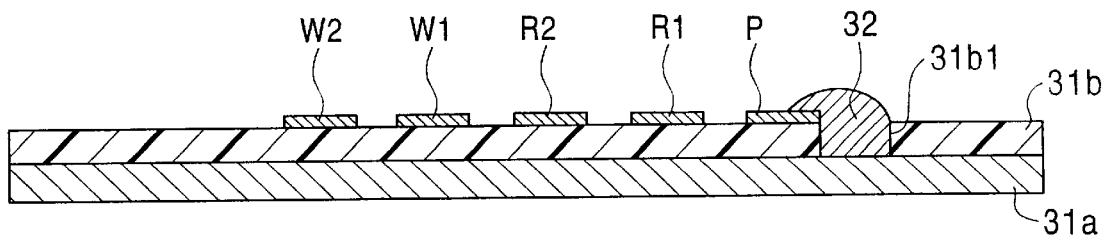
FIG. 4 is a cross sectional view of the magnetic head apparatus shown in FIG. 3 as seen along the line IV-!V.

FIGS. 2 and 3 are partial perspective views of the test pads $T_{W1}$ and $T_{W2}$ of the magnetic head apparatus shown in FIG. 1. FIG. 4 is a cross sectional view taken along the line IV—IV of FIG. 3.

In this preferred embodiment, the wiring member 31 includes the reproducing conductive patterns R1 and R2, recording conductive patterns W1 and W2, and control conductive pattern P formed on the conductive leaf spring 31a made of stainless steel, through the intermediary of an insulation layer 31b made of an insulating material such as polyimide. On the portion of the insulation layer 31b adjacent to the control conductive pattern P, as shown in FIG. 2, an aperture 31b1 is formed through which the leaf spring 31a is exposed. In this condition, the reproducing element and the recording element mounted on the slider 21 are accessible for a test.

Then as shown in FIGS. 3 and 4, the control conductive pattern P and the conductive leaf spring 31a are electrically connected by solder 32 through the aperture 31b1.

As described above, the electrode layers 12a1 and 13a1 of the piezoelectric elements 12 and 13 (as shown in FIG. 11) are grounded by being electrically connected with the load beam 11. The electrode layers 12a2 and 13a2 are connected with metallic wire 14, which is connected at the terminal 14a thereof with the control conductive pattern P laid on the wiring member 31 as shown in FIG. 1.

The control conductive pattern P and the conductive leaf spring 31a are electrically connected by soldering 32, and the conductive leaf spring 31a is grounded. Therefore, the electrode layers 12a1 and 13a1 and the electrode layers 12a2 and 13a2 of the piezoelectric elements 12 and 13 are all grounded. In other words, the electric potentials of the electrode layers 12a1, 13a1 and the electrode layers 12a2, 13a2 of the piezoelectric elements 12 and 13 are equalized. The load beam carrying the slider 21 and the wiring member 31 is cleaned while the electric potentials of various electrode layers of the piezoelectric elements 12 and 13 are held equal.

A supersonic cleaning operation, which is conducted while the electric potential of various electrode layers of the piezoelectric elements 12 and 13 are equal, prevents electrostatic charges from developing and accumulating in the piezoelectric elements 12 and 13, and therefore prevents the development of surge current and reduces the intensity thereof. Thus, it is possible to reduce any damage to the reproducing element and the recording element mounted on the slider 21. As it is possible to prevent the accumulation of electrostatic charge in the piezoelectric elements 12 and 13 during transportation, it is possible to prevent the development of surge current or reduce the intensity thereof and to reduce damage to the reproducing element and the recording element. In the magnetic head apparatus according to this preferred embodiment, the yield has improved by 40–60% as compared with the prior magnetic head apparatuses in which the control conductive pattern P is not grounded.

As for the method of electrically connecting the control conductive pattern P and the conductive leaf spring 31a through the aperture 31b1, methods other than soldering may be used, for example ball bonding or conductive adhesives. The control conductive pattern P and the conductive leaf spring 31a may also be electrically connected by means of a conductive clip.

After the magnetic head apparatus is mounted on a hard disk apparatus as shown in FIG. 10, the electrical connection between the electrode layers 12a2 and 13a2 of the piezoelectric elements 12 and 13 and the ground is cancelled.

According to this preferred embodiment, the reproducing conductive patterns R1 and R2 and the recording conductive patterns W1 and W2 are connected with the test pads $T_{R1}$, $T_{R2}$, $T_{W1}$ and $T_{W2}$, respectively, laid on the base end side 31B of the wiring member 31. The control conductive pattern P is connected with the test pad $T_P$ laid on the base end side 31B. After the magnetic head apparatus is mounted on a hard disk apparatus, the wiring member 31 is cut off along the line CC shown in FIG. 1, and the test pads $T_{R1}$, $T_{R2}$, $T_{W1}$, $T_{W2}$ and $T_P$ are removed.

The aperture 31b1 created on the insulation layer 31a of the wiring member 31, where the control conductive pattern P and the conductive leaf spring 31b are electrically connected, is located in an area which will be removed together with the test pads $T_{R1}$, $T_{R2}$, $T_{W1}$, $T_{W2}$ and $T_P$.

Therefore, when the wiring member is cut off along the line C—C shown in FIG. 1, the electrical connection between the electrode layers 12a2 and 13a2 of the piezoelectric elements 12 and 13 and the ground is cancelled. According to this preferred embodiment, the reliability of the magnetic head apparatus is not adversely affected, because the control conductive pattern P is grounded and then disconnected from the ground.

Figure 5:
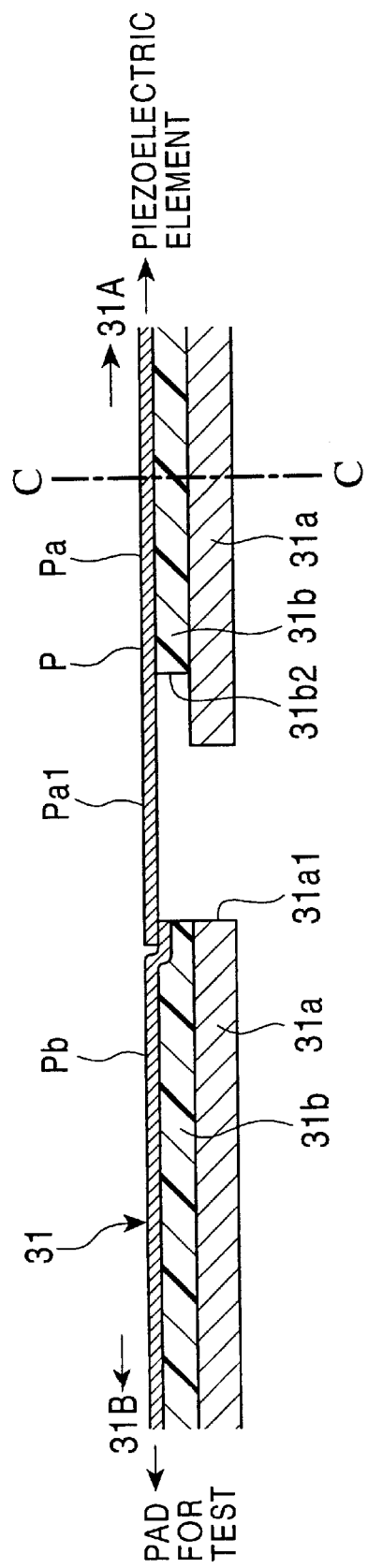
FIG. 5 is a longitudinal sectional view of the magnetic head apparatus according to the second preferred embodiment of the present invention.
Figure 6:
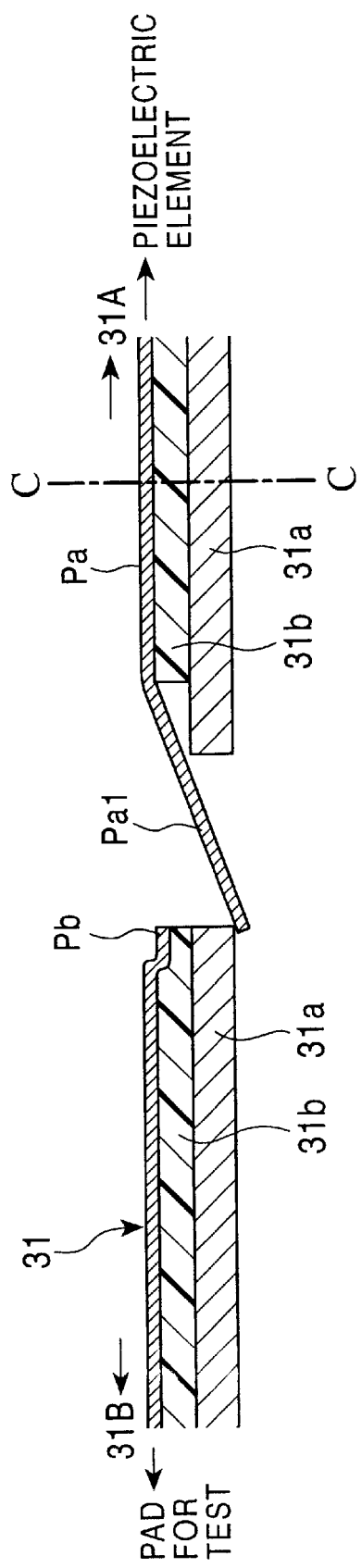
FIG. 6 is a longitudinal sectional view of the magnetic head apparatus according to the second preferred embodiment of the present invention.

FIGS. 5 and 6 are partial cross sectional views showing another method for electrically connecting the control conductive pattern P and the conductive leaf spring 31a. FIGS. 5 and 6 show the section of the control conductive pattern P taken along the length thereof (direction from the distal end 31A of the wiring member 31 to the base end 31B). The control conductive pattern P is divided into a segment Pa and a segment Pb between the test pad $T_P$ and the terminal 14b. Moreover, an aperture 31b2 and another aperture 31a2 are formed in the insulation layer 31b underlying the distal end Pa1 of the segment Pa and in the conductive leaf spring 31a.

Referring to FIG. 5, the segment Pa and the segment Pb are electrically connected. The reproducing element and the recording element mounted on the slider 21 are tested in the state shown in this FIG. 5. After the completion of the test, the distal end Pa1 of the segment Pa is bent, and the bent distal end Pa1 and the conductive leaf spring 31a are electrically connected at the aperture 31a1 in the conductive leaf spring 31a.

Even in the state shown in FIG. 6, electrostatic charges are generated in the piezoelectric elements 12 and 13. However, such electrostatic charges are released to the ground through the distal end Pa1 of the segment Pa of the control conductive pattern P and the conductive leaf spring 31a, without being accumulated. Therefore, it is possible to prevent the development of surge current or to reduce the intensity thereof, and to reduce damages on the reproducing element and the recording element mounted on the slider 21.

When the wiring member is cut off along the line C—C shown in FIGS. 5 and 6, the electric connection between the electrode layers 12a2 and 13a2 of the piezoelectric elements 12 and 13 and the ground is cancelled at the same time.

Figure 7:
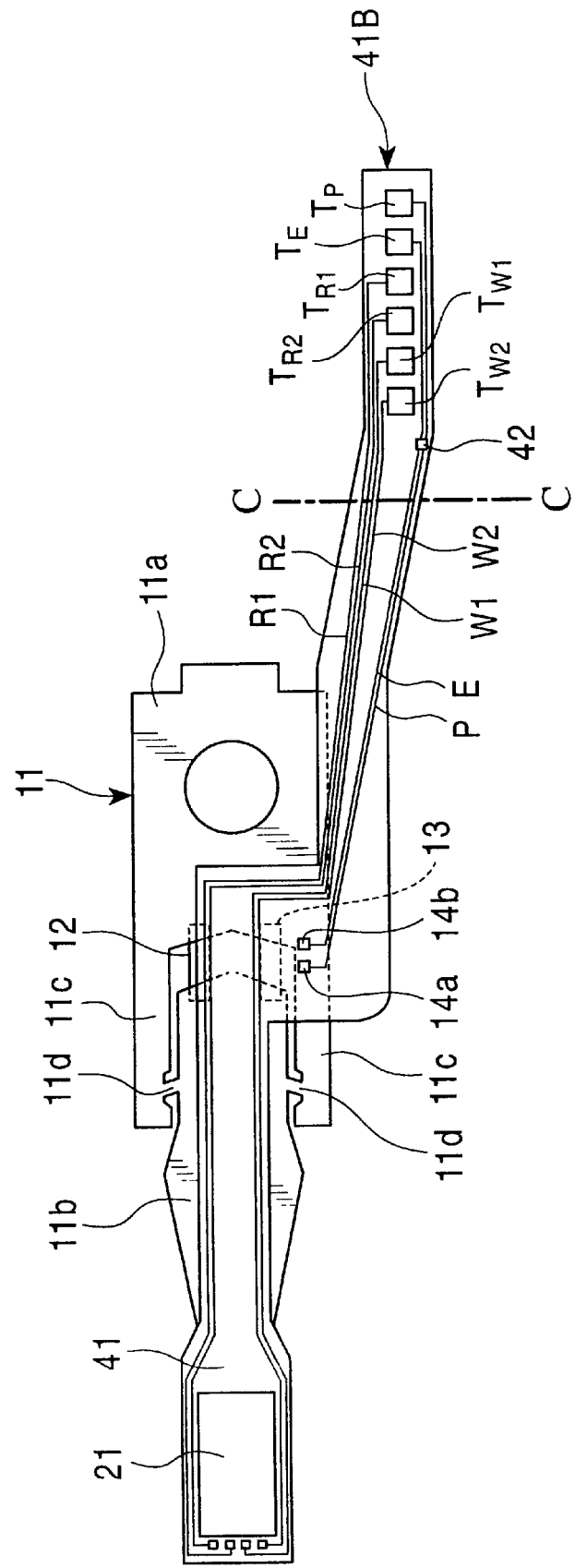
FIG. 7 is a top plan view of the magnetic head apparatus according to the third preferred embodiment of the present invention.
Figure 8:
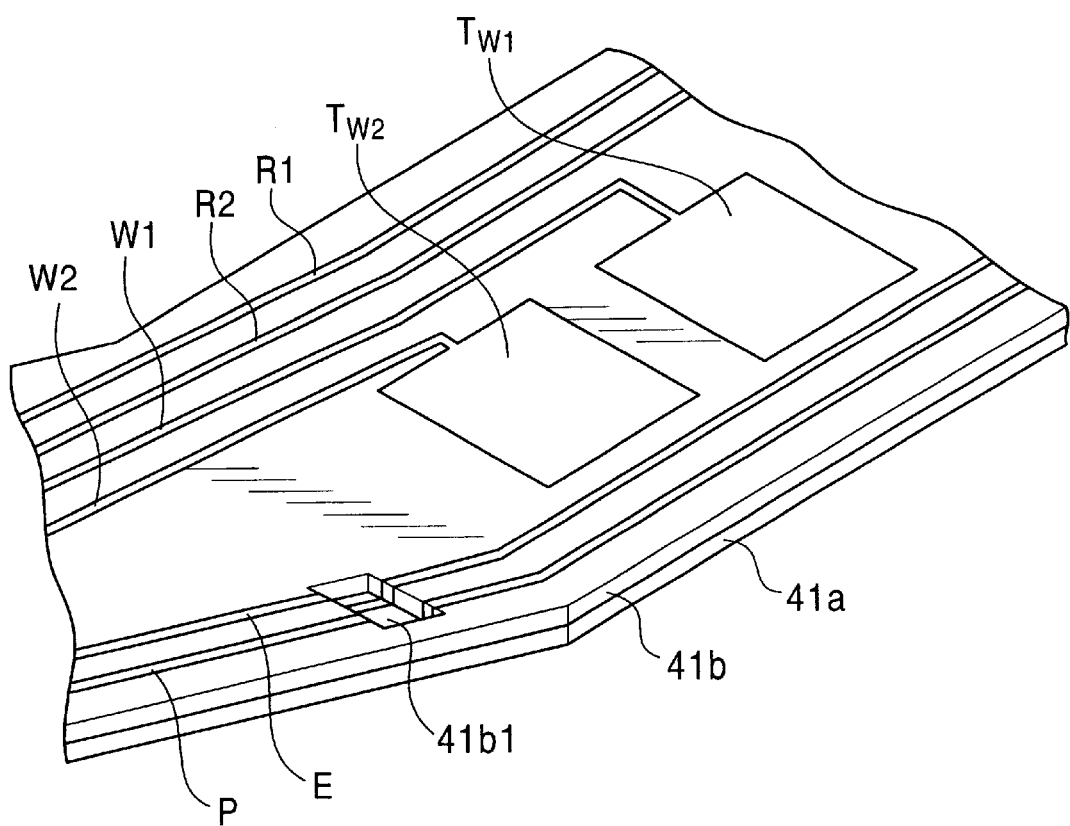
FIG. 8 is a partial perspective view of the test pads of the magnetic head apparatus shown in FIG. 7.
Figure 9:
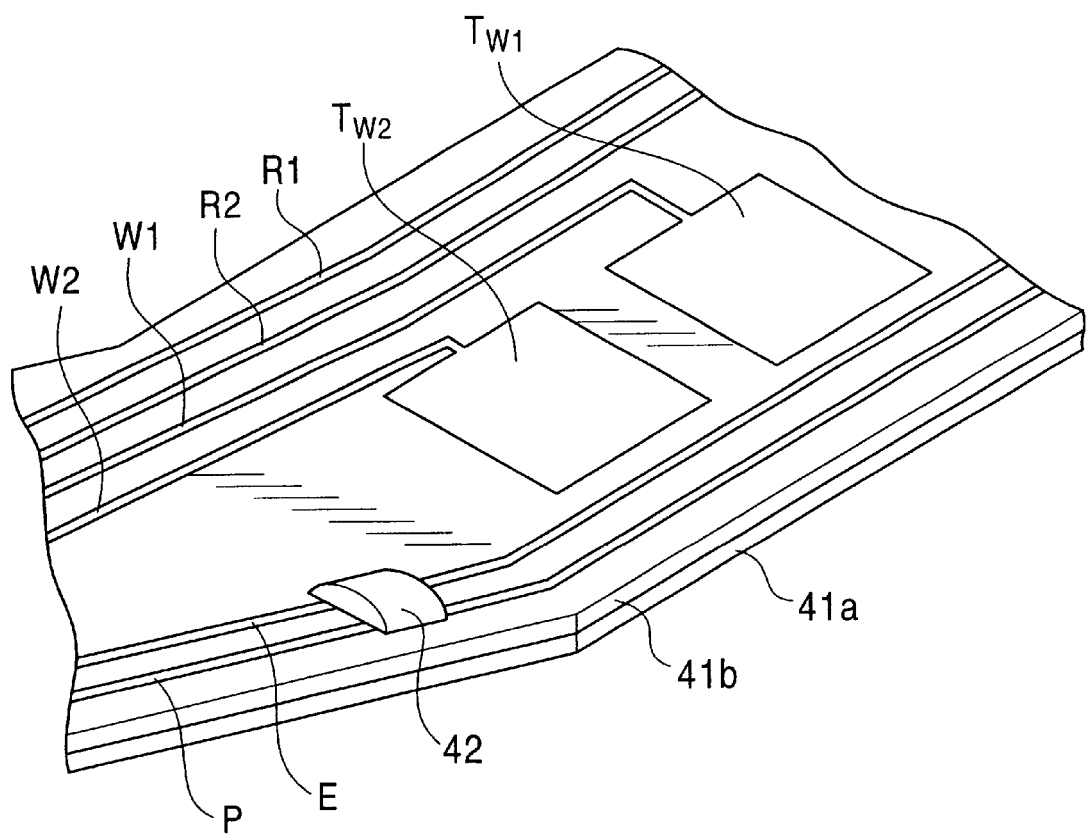
FIG. 9 is a partial perspective view of the test pads of the magnetic head apparatus shown in FIG. 7.

FIG. 7 is a top plan view showing the magnetic head apparatus according to another preferred embodiment of the present invention. FIGS. 8 and 9 are partial perspective views of the test pads $T_{W1}$ and $T_{W2}$ of the magnetic head apparatus shown in FIG. 7.

According to this preferred embodiment, a grounding pattern E is formed on the wiring member 41. The grounding pattern E is connected with the grounding electrodes (the electrode layer 12a1 and the electrode layer 13a1 as shown in FIG. 11) of the piezoelectric elements 12 and 13 through a terminal 14b. Electrodes other than the grounding electrodes of the piezoelectric elements 12 and 13 (the electrode layer 12a2 and the electrode layer 13a2 as shown in FIG. 11) are connected with the control conductive pattern P through the terminal 14a. The grounding pattern E is grounded. The control conductive pattern P is arranged to supply control signals to the piezoelectric elements.

Referring to FIG. 8, the grounding pattern E and the control conductive pattern P are electrically connected. The reproducing element and the recording element mounted on the slider 21 are tested in the state shown in FIG. 8.

Then, as shown in FIG. 9, the grounding pattern E and the control conductive pattern P are electrically connected by means of soldering 42, and the control conductive pattern P is grounded. Therefore, the electrode layers 12a1 and 13a1 and the electrode layers 12a2 and 13a2 of the piezoelectric elements 12 and 13 are all grounded. In other words, the electric potentials of the electrode layers 12a1 and 13a1 and the electrode layers 12a2 and 13a2 of the piezoelectric elements 12 and 13 are equalized. Thus, the load beam carrying the slider 21 and the wiring member 41 is cleaned while the electric potentials of various electrode layers of the piezoelectric elements 12 and 13 are held equal.

A supersonic cleaning operation, that is conducted while the electric potentials of various electrode layers of the piezoelectric elements 12 and 13 are held equal, prevents the accumulation of electrostatic charge on the piezoelectric elements 12 and 13, and therefore prevents the development of surge current or reduces the intensity thereof. Thus, it is possible to reduce the damage to the reproducing element and the recording element mounted on the slider 21. In addition, because it is possible to prevent the accumulation of electrostatic charges in the piezoelectric elements 12 and 13 during transportation, it is possible to prevent the development of a surge current or reduce the intensity thereof, and to reduce the damage on the reproducing element and the recording element.

In the meanwhile, the control conductive pattern P and the grounding pattern E may be electrically connected by means other than soldering, for example by ball bonding or by conductive adhesives. The control conductive pattern P and the grounding pattern E may also be electrically connected by using conductive clips.

Referring to FIG. 8, in order to facilitate the supply of an adequate amount of solder 42 for electrically connecting the control conductive pattern P and the grounding pattern E to adequate positions, a concavity 41b1, not allowing the exposure of the leaf spring 41a, is formed in the insulation layer 41b made of polyimide laminated on the conductive leaf spring 41a of the wiring member 41. The provision of such a concavity, however, is not essential.

After the magnetic head apparatus is mounted on a hard disk apparatus as shown in FIG. 10, the electric connection between the electrode layers 12a2 and 13a2 of the piezoelectric elements 12 and 13 is cancelled.

In this preferred embodiment, the reproducing conductive patterns for reproduction R1 and R2 and the recording conductive patterns W1 and W2 are connected respectively with the test pads $T_{R1}$, $T_{R2}$, $T_{W1}$ and $T_{W2}$ formed on the base end 41B of the wiring member 41. The grounding pattern E and the control conductive pattern P are connected respectively with the test pads $T_E$ and $T_P$ formed on the base end 41B of the wiring member 41.

After the magnetic head apparatus is mounted on the hard disk apparatus, the wiring member 41 is cut off along the line C—C of FIG. 7, and the test pads $T_{R1}$, $T_{R2}$, $T_{W1}$, $T_{W2}$, $T_E$ and $T_P$ are removed. The position where the control conductive pattern P and the grounding pattern E are electrically connected by soldering 42 is in an area to be removed together with test pads $T_{R1}$, $T_{R2}$, $T_{W1}$, $T_{W2}$ and $T_P$.

Therefore, when the wiring member 41 is cut off along the line C—C shown in FIG. 7, the electrical connection between the electrode layers 12a2 and 13a2 of the piezoelectric elements 12 and 13 and the ground is cancelled. In this preferred embodiment, the reliability of the magnetic head apparatus is not adversely affected, because the control conductive pattern P is grounded and then disconnected from the ground.

As will be understood from the foregoing description, the equalization of electrical potentials of various electrodes of the piezoelectric elements prevents the accumulation of electrostatic charges in the piezoelectric elements during the supersonic cleaning process or during transportation of the magnetic head apparatus, to prevent or reduce the development of surge currents and to reduce the damage on the reproducing element and the recording element.

According to the present invention, the grounding of all the electrodes of the piezoelectric elements easily equalizes the electric potentials of all the electrodes.

What is claimed is:

1. A magnetic head apparatus comprising:
   a slider carrying a reproducing element for detecting magnetic signals recorded on a recording medium by a magnetoresistive effect and a recording element for recording magnetic signals on the recording medium;
   a wiring member including an insulating layer overlying a conductive material and further including reproducing conductive patterns overlying the insulating layer and connected with the reproducing element and recording conductive patterns connected with the recording element;
   elastic support members for supporting the slider and the wiring member;
   piezoelectric elements for changing the posture of the slider by causing distortions of the elastic support members;
   wherein electrodes of the piezoelectric elements are temporarily connected to the conductive material so as to have equal electric potentials,
   where in at least one of the electrodes of the piezoelectric elements is a grounding electrode which is connected to a ground, and wherein the wiring member has a control conductive pattern for supplying control signals, the control conductive pattern being connected with electrodes other than the grounding electrode of the piezoelectric elements and being connected with the ground; and
   test pads connected with the reproducing conductive pattern, the recording conductive pattern, and the control conductive pattern at an end of the wiring member opposite to an end where the wiring member and the recording element are connected, the control conductive pattern being grounded at a region on the wiring member which is removable together with the test pads.

2. A magnetic head apparatus comprising:

a slider carrying a reproducing element for detecting magnetic signals recorded on a recording medium by a magnetoresistive effect and a recording element for recording magnetic signals on the recording medium;

a wiring member including reproducing conductive patterns connected with the reproducing element and recording conductive patterns connected with the recording element;

elastic support members for supporting the slider and the wiring member; and piezoelectric elements for changing the posture of the slider by causing distortions of the elastic support members, wherein electrodes of the piezoelectric elements have equal electric potentials, wherein at least one of the electrodes of the piezoelectric elements is a grounding electrode which is connected to a ground, and wherein the wiring member has a control conductive pattern for supplying control signals, the control conductive pattern being connected with electrodes other than the grounding electrode of the piezoelectric elements and being connected with the ground, and wherein the wiring member includes a conductive sheet on which the reproducing conductive pattern, the recording conductive pattern and the control conductive pattern are formed on an insulation layer, the insulation layer having a portion thereof adjacent to the control conductive pattern with an aperture through which the conductive sheet is exposed, the control conductive pattern being connected to the conductive sheet member via the aperture.

3. A magnetic head apparatus comprising:

a load beam including a swingable portion attached to a fixed base by elastic members;

a slider having a reproducing/recording element therein attached to an end of the swingable portion;

at least two piezoelectric elements, each piezoelectric element electrically grounded to the swingable portion and to the fixed base by grounding electrodes;

a wiring member including an insulating layer overlying a conductive material and further including a control signal line overlying the insulating layer and connected to signal electrodes on each piezoelectric element;

an elastic support member supporting the wiring member; and a removable connection electrically connecting the control signal line to the conductive layer, such that the grounding electrodes and the signal electrodes of the piezoelectric elements are at ground potential, wherein the removable connection comprises an electrical connection positioned in an aperture of the insulating layer.

4. A magnetic head apparatus according to claim 3, wherein the electrical connection comprises a solder bond.

5. A magnetic head apparatus according to claim 3, wherein the electrical connection comprises a ball bond.

6. A magnetic head apparatus according to claim 3, wherein the electrical connection comprises a conductive adhesive.

7. A magnetic head apparatus according to claim 3, wherein the electrical connection comprises a segment of the control line having a detachable end, and wherein the segment traverses the aperture and the detachable end contacts the conductive material.

8. A magnetic head apparatus according to claim 7, wherein segment has a bend therein, wherein the detachable end enters the aperture at the bend, and wherein the detachable end contacts a vertical surface of an opening in the conductive material.

* * * * *